Feb. 10, 1959   E. HOCHULI ET AL   2,873,204
PROCESS FOR PRODUCING EMBOSSED PRINTS
Filed March 10, 1955
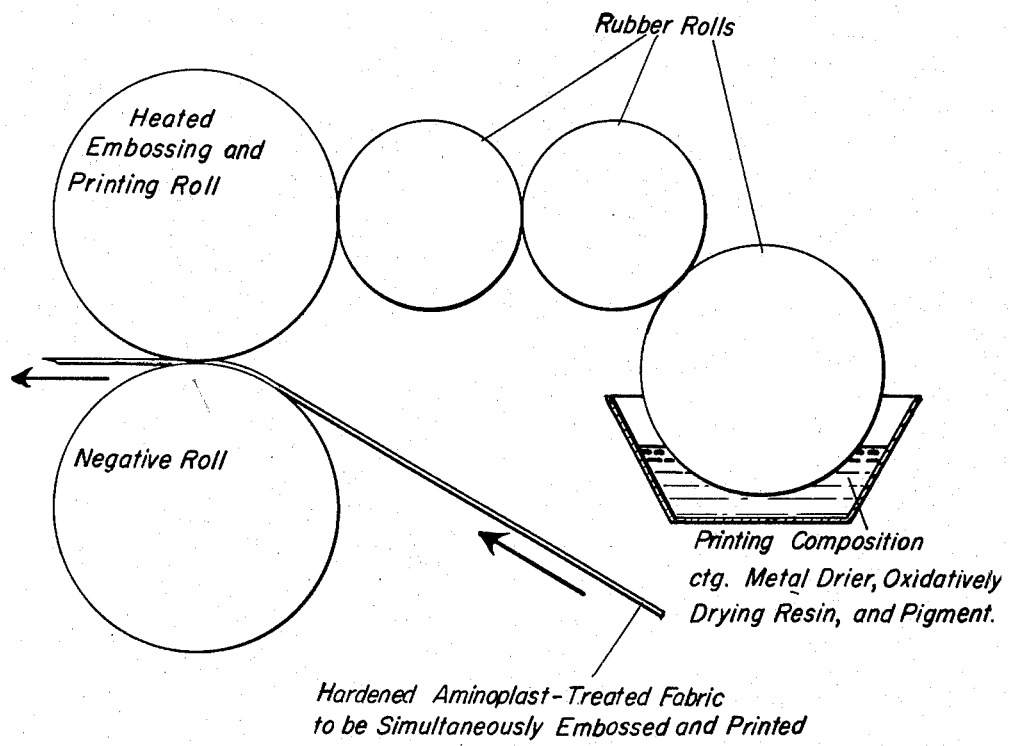
Ernst Hochuli, Hans Osolin, INVENTORS
Anton Schuerch and Heinz Zumstein
BY
Wenderoth, Lind & Ponack
ATTORNEYS

United States Patent Office 2,873,204
Patented Feb. 10, 1959

2,873,204

PROCESS FOR PRODUCING EMBOSSED PRINTS

Ernst Hochuli, Basel, Hans Osolin, Arlesheim, Anton Schuerch, Munchenstein, and Heinz Zumstein, Basel, Switzerland, assignors to Ciba Limited, Basel, Switzerland, a Swiss firm Application March 10, 1955, Serial No. 493,573

Claims priority, application Switzerland March 17, 1954

4 Claims. (Cl. 117—11)

In the customary method of roller printing on textiles the printing composition is applied to the material to be printed from depressions which are formed in the printing roller and correspond to the desired pattern. Usually the material so printed is first dried and then subjected to a treatment for fixing the dyestuff on the fiber. In the case of dyestuffs which possess an affinity for the fiber, for example, when direct-dyeing dyestuffs are applied to cellulose fibers or acid wool dyestuffs are applied to animal fibers, a steaming process usually suffices. Vat dyestuffs can also be fixed under the same conditions if they are applied to the fiber in a previously reduced form or if vatting is brought about during the printing operation by the addition of a suitable reducing agent, for example, sodium formaldehyde-sulfoxylate (also called sodium oxymethane sulfonate) in an alkaline medium.

In printing with pigment dyestuffs, which by their nature possess no affinity for fibers, by the roller printing process there is generally used a printing composition containing the desired pigment and a suitable binding agent and the composition is applied to the fabric to be printed from depressions in the printing roller. Depending on the nature of the binding agent used the printing can be fixed by steaming, by a dry heating operation at a raised temperature, by simply suspending the material at room temperature, or by another treatment which has the effect of converting the binding agent present in the printing composition into an insoluble condition.

In all the processes mentioned above the printing composition is applied from the printing roller on to the fabric at approximately room temperature, and any necessary treatment at a raised temperature is applied to the printed material, for example, the steaming treatment or the dry heating operation. This has the great advantage that the viscosity and the general printing properties of the printing composition (consistency) can be controlled and correctly adjusted at room temperature.

On the other hand, it is also known to produce embossed effects resistant to washing on textiles impregnated with hardenable artificial resin precondensates, especially hardenable aminoplasts, for example, cellulose fibers such as cotton or artificial silk and suitable fibers of regenerated cellulose, by embossing with embossing rollers heated at relatively high temperatures, for example, above 150° C. For this purpose, for example, there is prepared for a given metal embossing roller an exactly complementary negative roller having, for example, a thick multi-layer paper covering. The metal embossing roller may be heated, for example, by means of an open gas flame or electrically, at a temperature up to about 200° C. or higher. By passing a fabric impregnated with a hardenable artificial resin precondensate and, if desired, a catalyst, between the heated embossing roller and the negative roller there are brought about in a very short time both the embossing of the fabric and so far-reaching a condensation of the artificial resin that complete hardening of the resin can be carried out without the need of special precautions, for example, by a passage through the air lasting about 5 minutes at about 140–160° C., and the fabric may then be rolled up or laid aside. In general the fabric so treated is then washed, but it generally possesses the desired properties, that is to say, a permanent embossed effect, before the further treatments, which may be desired for a very wide variety of reasons, have been carried out.

It is easy to understand that innumerable difficulties, which are closely connected with the essential conditions of the embossing treatment, stand in the way of carrying out color printing simultaneously with the above mentioned embossing treatment. A printing composition which is to be applied to the fiber by means of the embossing roller, must withstand temperatures up to 200° C. or higher at least for a short time without losing its printing properties, that is to say, without hardening prematurely or dropping off the printing roller. Furthermore, no solvent vapours which are injurious to health or inflammable should be discharged into the surrounding atmosphere. Nevertheless, the fixation of the color must take place so rapidly that the usual procedure for producing embossed articles can be maintained. Finally, embossed prints of the above kind must also fulfill various fastness requirements, for example, fastness to washing, dry cleaning, rubbing and light.

The present invention is based on the observation that embossed prints of the above kind can be produced in an advantageous manner on fibrous materials treated with hardenable artificial resin precondensates, especially a hardenable aminoplast, by applying the printing composition to the material with the aid of a heated embossing roller, if there is used a pigment-containing printing composition which contains a metal drier and a resin capable of undergoing oxidative drying in the presence of the drier and containing more than three unsaturated groups per molecule.

The resins used in the present process may belong to various groups of compounds and may be derived, for example, from a very wide variety of polymethylol-compounds which are etherified with more than three allyl groups. Especially advantageous are allyl ethers of polymethylol compounds of melamine which contain, for example, 4–6 allyl ether groups in the molecule.

There may also be used in the present process, more especially, ester-like resins (ester resins) from polyhydroxy compounds, which contain unsaturated fatty acid radicals, and especially radicals of linseed oil fatty acid, for example, an alkyl resin modified with linseed oil. The resins to be reacted with the unsaturated fatty acids or oils may be obtained, for example, by condensing a polyhydric alcohol, such as glycerine, with a polybasic carboxylic acid such as phthalic acid, or an anhydride thereof. In many cases it is of advantage to use as a resin in the present process an epoxide compound (glycidyl ether) reacted with an unsaturated fatty acid, such as is obtainable in known manner by condensing epichlorhydrin or glycerine dichlorhydrin under alkaline conditions with a polyhydric alcohol or phenol, especially with 4:4'-dihydroxydiphenyldimethyl-methane.

These resins can be made by methods in themselves known, and details will be found in the examples which follow.

As the metal driers there may be used in the present process the known oil-soluble compounds of divalent or polyvalent metals, for example, lead, calcium, cobalt or the like, and especially their naphthenates which are often used as driers on account of their good properties.

The printing compositions of the present invention may contain as pigments any desired inorganic or organic pigments, such as titanium oxide, carbon black, lead chromates, azo-dyestuffs of a very wide variety of constitutions, for example, those derived from diazo-compounds and 2:3-hydroxy-naphthoic acid arylides, vat dyestuffs such as indigo, indanthrone and other organic pigments such as copper phthalocyanine and highly chlorinated copper phthalocyanine.

In many cases it is of advantage to use other additions in making up the printing compositions, for example, drying oils such as linseed oil or wood oil, or chemically inert products compatible with oils, for example, chlorinated paraffin wax.

The printing compositions can be made up in the usual manner by mixing and rubbing, for example, on a 3-roller mill or other intensive mixing and disintegrating apparatus, if desired, with the aid of a funnel mill. By suitably choosing the ratio of the various ingredients used for making the printing composition it is generally easy so to adjust the viscosity of the composition that it can be applied to the hot embossing roller at the ordinary or a slightly raised temperature by means of a roller and without dropping off the hot embossing roller. It is conceivable that at the high temperature to which the printing composition is heated on the hot embossing roller a protective skin of dried binding agent is immediately formed, which protects the underlying portion of the printing composition for the short period which precedes transfer of the composition to the fabric.

In grinding the printing composition it is of advantage to add the drier immediately before the end of the grinding operation. It may also be of advantage to incorporate the pigment in the printing composition in a very finely dispersed form, for example, in the form of a preparation which contains the pigment in a finely dispersed form in a substratum compatible with oil or in a suitable oil.

In carrying out the process there is advantageously used an apparatus of the kind hereinbefore described, in which the material treated with an artificial resin precondensate, for example, a fabric of cellulose fibers, such as cotton, linen or artificial silk or stable fibers of regenerated cellulose, or polyamide fibers or similar artificial fibers, is passed between the heated embossing roller and a complementary negative roller. Depending on the artificial resin precondensate used and on the effect desired, the embossing roller may be heated at a temperature within the range of 150–220° C., advantageously within the range of about 180–200° C., by means of an open flame or by electrical heating means, and the printing composition is advantageously applied by means of an intermediate roller to the heated embossing roller in such manner that the composition travels through a short path and does not remain on the heated embossing roller for an unduly long period before it is applied to the fibrous material.

The printing compositions of this invention in general enable the prints to be fixed very rapidly and the fastness of the fixation fulfils a very wide range of requirements. In particular, prints can be produced which possess considerable fastness to light and are fast to washing and boiling and also to rubbing and dry cleaning. The process is simple to carry out and entails notably little trouble from odours. If, when linseed oil is used, the finished prints still possess a certain odour the latter can be removed by soaping or other known methods, having regard to the good properties of fastness of the prints.

The accompanying figure of drawing diagrammatically illustrates an embodiment for carrying out the instant invention.

The following examples illustrate the invention, the parts and percentages being by weight:

*Example 1*

Printing compositions (a)–(f) are prepared as follows:

(a) 150 parts of resin I (see below) are heated with 80 parts of linseed oil suitable for varnish (unboiled) and 10 parts of chlorinated paraffin wax at 70–100° C. and thoroughly mixed together. After being cooled, the mixture is triturated on a 3-roller mill with 36 parts of the red disazo-dyestuff obtained by converting the azo-dyestuff from diazotized 1-amino-2-methyl-5-chlorobenzene and 2:3-hydroxynaphthoic acid into its acid chloride and condensing 2 molecular proportions of the dyestuff with one molecular proportion of benzidine. Before the final passage through the mill there are added 0.4 part of cobalt naphthenate (cobalt content of 8%), 1.2 parts of calcium naphthenate (calcium content of 4%) and 1.6 parts of lead naphthenate (lead content of 25%) in the form customary for such driers.

(b) 130 parts of resin I (see below) are mixed with 100 parts of linseed oil suitable for varnish and 10 parts of chlorinated paraffin wax as described under (a) above, and after cooling the mixture it is triturated with a very finely dispersed mixture of 18 parts of gas carbon and 2 parts of copper phthalocyanine in 40 parts of hydrogenated colophony glycerine ester. Before the final passage through the mill there are added 0.4 part of cobalt naphthenate, 1.2 parts of calcium naphthenate and 2 parts of lead naphthenate.

The following printing compositions are prepared with the following dyestuffs as follows:

(c) Highly chlorinated copper phthalocyanine (green).

(d) A mixture of 4 parts of copper phthalocyanine and 1 part of indanthrone (Color Index, No. 1106).

(e) A mixture of equal parts of Hansa Yellow 10 G (Schultz, Farbstofftabellen, 7th edition, No. 84) and Chrome Yellow Citron (Color Index No. 1270).

(f) Titanium dioxide.

|  | (c) | (d) | (e) | (f) |
| --- | --- | --- | --- | --- |
| Resin I | 155 | 150 | 150 | 150 |
| Linseed oil suitable for varnish | 75 | 80 | 80 | 80 |
| Chlorinated paraffin wax | 10 | 10 | 10 | 10 |
| Pigment | 30 | 30 | 25 | 20 |
| Cobalt naphthenate | 0.4 | 0.4 | 0.4 | 0.4 |
| Calcium naphthenate | 1.2 | 1.2 | 1.2 | 1.2 |
| Lead naphthenate | 2.0 | 2.0 | 2.0 | 2.0 |

A cotton fabric is foularded with an aqueous solution which contains, per liter, 90 grams of hexamethylolmelamine tetramethyl ether, 5 grams of the quaternary condensation product of hexamethylol-melamine hexamethyl ether, stearic acid methylolamide, triethanolamine and benzyl chloride (see U. S. patent application, Serial No. 304,442, filed August 14, 1952 by Albrecht et al., now U. S. Patent No. 2,783,231, Example 4, third paragraph), and 3 grams of ammonium chloride. The fabric is squeezed until its increase in weight is about 100%, and dried at about 80° C. to a water content of 10–15%.

The fabric so pretreated is fed to an embossing calender having an embossing roller heated at about 200° C. and a complementary negative roller having a paper covering. A layer of one of the printing compositions (a)–(f) is applied to the raised portions of the heated embossing roller by means of a few (for example, three) rubber rollers from a suitable trough.

After being passed through the embossing and printing apparatus, the fabric is heated for 5 minutes at 145–150° C., for example, while being hung up, then allowed to stand for one day, and washed at 70–80° C. for 30 minutes in a bath containing, per liter of liquor, 2 grams of anhydrous sodium carbonate and 5 grams of sodium N-benzyl-μ-heptadecyl-benzimidazole disulfonate, and then rinsed and dried.

There are obtained embossed effects which are fast to washing and of which the depressed portions are printed fast to washing in the following colors:

(a) Red
(b) Black
(c) Green
(d) Blue
(e) Yellow
(f) White

For pretreating the fabric there may be used in this example with similar success, instead of the hexamethylol-melamine tetramethyl ether, a corresponding amount of dimethylol-melamine or a product etherified with methanol, which has been obtained by condensing one molecular proportion of urea with 4.5 molecular proportions of an aqueous solution of formaldehyde at a pH value of 8.5 for one hour at 95° C.

Resin I used in this example may be prepared as follows:

By reacting 4:4'-dihydroxydiphenyl-dimethylmethane of the formula

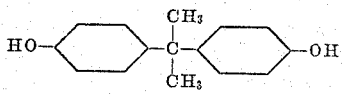

with epichlorhydrin in known manner there is obtained a compound which contains about 2.3 gram equivalents of epoxide groups per kilogram, and therefore has an epoxide equivalent weight of 435 (product I), and also a compound which contains about 1.25 gram equivalents of epoxide groups per kilogram and therefore has an epoxide equivalent weight of 800 (product II). 100 parts of product I and 440 parts of product II are esterified in a manner in itself known with 460 parts of linseed oil fatty acid with the simultaneous addition of 300 parts of linseed oil suitable for varnish.

Example 2

Hexamethylol-melamine methyl ether is transesterified to a considerable extent with linseed oil fatty acid. 90 parts of the product so obtained are worked up well on a 3-roller mill with 10 parts of a finely dispersed pigment preparation containing about 60% of the glycerine ester of hydrogenated colophony and about 40% of the dyestuff of the formula

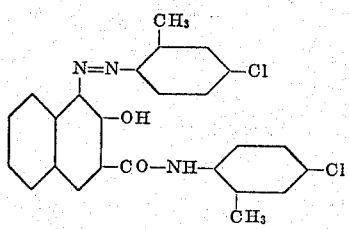

Before the final passage through the mill there are added 0.4 part of cobalt naphthenate, 1.2 parts of calcium naphthenate and 1.6 parts of lead naphthenate. Printing is carried out with the resulting printing composition in the manner described in Example 1, and a fast red embossed print is obtained.

If there is sufficient time available for hardening the print on the fiber the proportion of the drier may be reduced.

In preparing the printing composition there may also be used an ordinary commercial air-drying alkyd resin having a phthalic acid content of about 25% and a fatty acid content of about 60%, the latter consisting essentially of linseed oil fatty acid.

Example 3

140 parts of the resin mixture described in the last sentence of Example 1 are worked well on a 3-roller mill with 95 parts of linseed oil and 5 parts of highly chlorinated paraffin wax and 30 parts of 5:5'-dichloro-7:7'-dimethyl-thio-indigo. Before the final passage through the mill there are added 1.2 parts of calcium naphthenate. A viscose artificial silk fabric, which has been pretreated as described in Example 1, is printed with the resulting printing composition. There is obtained a fast Bordeaux red embossed print.

What is claimed is:

1. A process for producing an embossed print on a fabric treated with a hardenable aminoplast, which comprises simultaneously embossing and applying a printing composition to the said fabric by means of a heated embossing roller, the said printing composition consisting essentially of a pigment, a metal drier and a resin which is capable of undergoing oxidative drying in presence of the said drier and is selected from the group consisting of an allyl ether of a polymethylol-melamine containing more than three allyl ether groups, an esterified polyhydroxy compound containing more than three linseed oil fatty acid radicals, and a glycidyl ether of a dihydric phenol esterified with linseed oil fatty acid containing more than three radicals of the said acid.

2. A process for producing an embossed print on a fabric treated with a hardenable aminoplast, which comprises simultaneously embossing and applying a printing composition to the said fabric by means of a heated embossing roller, the said printing composition consisting essentially of a metal drier and a glycidyl ether of a dihydric phenol esterified with linseed oil fatty acid containing more than three radicals of the said acid, and a pigment.

3. A process for producing an embossed print on a fabric treated with a hardenable aminoplast, which comprises simultaneously embossing and applying a printing composition to the said fabric by means of a heated embossing roller, the said printing composition consisting essentially of a metal drier and an allyl ether of a polymethylol-melamine containing more than three allyl ether groups, and a pigment.

4. A process for producing an embossed print on a fabric treated with a hardenable aminoplast, which comprises simultaneously embossing and applying a printing composition to the said fabric by means of a heated embossing roller, the said printing composition consisting essentially of a metal drier and an esterified polyhydroxy compound containing more than three linseed oil fatty acid radicals, and a pigment.

References Cited in the file of this patent

UNITED STATES PATENTS

| | | |
|---|---|---|
| 2,049,507 | McBurney et al. | Aug. 4, 1936 |
| 2,454,495 | Widmer et al. | Nov. 23, 1948 |
| 2,667,426 | Davis | Jan. 26, 1954 |

OTHER REFERENCES

Epon Surface Coating Resins, Shell Chemical Corp., 1948, pp. 10, 15 and 16.